(12) United States Patent
Kuwata et al.

(10) Patent No.: US 7,230,742 B1
(45) Date of Patent: Jun. 12, 2007

(54) IMAGE DATA INTERPOLATING APPARATUS AND MEDIUM ON WHICH DATA INTERPOLATING PROGRAM IS RECORDED

(75) Inventors: Naoki Kuwata, Nagano-ken (JP); Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/581,437

(22) PCT Filed: Oct. 8, 1999

(86) PCT No.: PCT/JP99/05582

§ 371 (c)(1),
(2), (4) Date: Jun. 13, 2000

(87) PCT Pub. No.: WO00/22571

PCT Pub. Date: Apr. 20, 2000

(30) Foreign Application Priority Data

Oct. 13, 1998 (JP) .......................................... 10-290858

(51) Int. Cl.
*H04N 1/40* (2006.01)

(52) U.S. Cl. ........................ 358/3.15; 358/2.1; 382/264
(58) Field of Classification Search ....... 358/3.14–3.15, 358/1.9, 2.1, 3.27; 382/199–200, 260–269
See application file for complete search history.

(56) References Cited

U.S. PATENT DOCUMENTS

| | | | |
|---|---|---|---|
| 5,054,100 A | | 10/1991 | Tai |
| 5,335,298 A | * | 8/1994 | Hevenor et al. ............. 382/199 |
| 5,418,899 A | * | 5/1995 | Aoki et al. .................. 345/668 |
| 5,561,724 A | | 10/1996 | Kido et al. |
| 5,650,585 A | | 7/1997 | Pate et al. .................. 358/298 |
| 5,805,304 A | | 9/1998 | Sekine |
| 6,339,479 B1 | * | 1/2002 | Kishimoto .................. 358/1.2 |
| 6,477,282 B1 | * | 11/2002 | Ohtsuki et al. ............. 382/266 |

FOREIGN PATENT DOCUMENTS

| | | |
|---|---|---|
| EP | 0 584 966 A1 | 3/1994 |
| EP | 0 798 664 A2 | 10/1997 |
| JP | 4-186486 | 7/1992 |
| JP | 4-188283 | 7/1992 |
| JP | 5 207271 | 8/1993 |
| JP | 5-236260 | 9/1993 |
| JP | 6-225140 | 8/1994 |
| JP | 8-156326 | 6/1996 |
| JP | 10 155128 | 6/1998 |
| JP | 10-248012 | 9/1998 |
| JP | 0 798 664 A3 | 10/1998 |
| JP | 2002293677 A * | 10/2002 |

OTHER PUBLICATIONS

Patent Abstract of Japan 08156326 Jun. 18, 1996, Abstract.
Patent Abstract of Japan 04188283 Jul. 6, 1992, Abstract.
Patent Abstract of Japan 6–225140 Aug. 12, 1994, Abstract.

* cited by examiner

Primary Examiner—Thomas D. Lee
Assistant Examiner—Stephen Brinich
(74) Attorney, Agent, or Firm—Sughrue Mion, PLLC

(57) ABSTRACT

Even when a jaggy occurs in an original image, the image is accurately enlarged and a good image cannot be obtained as a result. In the case of performing pixel interpolation on an image in a dot matrix state, image data is entered in step 100, the whole image is scanned while shifting a marked pixel, and whether or not an edge exists in the direction of 45 or 135 degrees by using the marked pixel as a reference is detected in step 115. When an edge at 45 or 135 degrees exists, the edge is smoothed in the direction of either 45 degrees in step 120 or 135 degrees in step 125. After that, pixel interpolation is carried out irrespective of the presence or absence of an edge. Consequently, when there are irregular edges, it can be prevented that an image is directly subjected to pixel interpolation and a jaggy occurs.

21 Claims, 25 Drawing Sheets

FIG.9

|  |  |  |
|---|---|---|
| (j−1, i−1) | (j−1, i) | (j−1, i+1) |
| (j, i−1) | (j, i) | (j, i+1) |
| (j+1, i−1) | (j+1, i) | (j+1, i+1) |

FIG.10

| 1 | 1 | 1 |
|---|---|---|
| 1 | −8 | 1 |
| 1 | 1 | 1 |

FIG.11

|   | 1 |   |
|---|---|---|
| 1 | −4 | 1 |
|   | 1 |   |

FIG.12

|   | 1 |   |
|---|---|---|
|   | -2 | 1 |
|   |   |   |

※ 37th pixel

※ 37th pixel

ΣA

ΣB

ΣA

ΣB

Y (j, i)
※11th pixel

IMAGE DATA INTERPOLATING APPARATUS AND MEDIUM ON WHICH DATA INTERPOLATING PROGRAM IS RECORDED

TECHNICAL FIELD

The present invention relates to an image data interpolating method, an image data interpolating apparatus, and a medium on which an image data interpolating program is recorded.

BACKGROUND ART

When an image is dealt by a computer or the like, the image is expressed by pixels in a dot matrix state and each pixel is expressed by a gradation value. For example, a photograph or computer graphic is often displayed by pixels of 640 dots in the horizontal direction and 480 dots in the vertical direction on the screen of a computer.

On the other hand, the performance of a color printer has been being remarkably improved. The color printer has extremely high definition such as dot density of 720 dpi. In the case of printing an image of 640×480 dots in a corresponding manner on a dot unit basis, the image becomes very small. In this case, since the gradation values are different and the meaning itself of resolution differs, the image has to be converted to data for printing by interpolating the dots.

As conventional methods of interpolating dots in such a case, methods such as nearest neighboring interpolation (hereinbelow, called a nearest method) and cubic convolution interpolation (hereinbelow, called a cubic method) are known. Japanese Unexamined Patent Application No. 6-225140 discloses a technique of smoothing an edge in the event of interpolating dots by preparing a dot pattern by which an image is enlarged in a shape having a smooth edge.

DISCLOSURE OF INVENTION

The conventional technique has the following problems.

Although an interpolating operation of the cubic method requires an arithmetic process of a high load, an image is smooth and is not blurred. An image is, however, accurately enlarged even when a jaggy occurs in the original image, so that a good image cannot be obtained as a result.

On the other hand, in the invention disclosed in Japanese Unexamined patent application No. 6-225140, since a pattern has to be prepared, an interpolation magnification has to be fixed. The invention therefore cannot cope with an arbitrary interpolation magnification. On the precondition of using a color image, the number of patterns is enormous and it is difficult to even prepare the patterns.

The invention has been achieved in consideration of the above problems and its object is to provide an image data interpolating method, an image data interpolating apparatus, and a medium on which a printing image data interpolation program is recorded, which can suppress a jaggy in an interpolated image even when an original image has a jaggy portion.

In order to achieve the object, the invention according to claim 1 comprises: an edge direction detecting step of detecting an edge included in image data and a continuing direction of the edge; an edge smoothing step of smoothing a portion of the detected edge along the edge continuing direction; and a pixel interpolating step of performing an interpolating process after smoothing the edge.

In the invention according to claim 1 constructed as described above, in the case of performing an interpolating process of increasing the number of pixels constructing image data, an edge included in image data and the continuing direction of the edge are detected in the edge direction detecting step. When the edge and the edge continuing direction are detected, smoothing is performed along the edge continuing direction in the detected edge portion in the edge smoothing step and, after smoothing of the edge, an interpolating process is performed in the pixel interpolating step.

That is, in the case of performing the pixel interpolation on an image in a dot matrix state, after performing the smoothing in the edge continuing direction (called an edge direction), namely, a direction parallel to the edge, the interpolating process is executed.

No jaggy occurs in a portion having no edge. A jaggy occurs in the edge portion in an original image. In this case, by preliminarily performing the smoothing operation in the continuing direction of the edge where a jaggy occurs, the jaggy is reduced. When the direction of the edge is recognized in the edge portion, therefore, by performing the smoothing process in the direction in advance, it can be prevented that a jaggy is caused by the faithful interpolating process.

Although the edge direction is detected in this case, since the smoothing is performed in a predetermined direction in order to prevent a jaggy from being enlarged when the pixel interpolation is performed faithfully to the original image, it can be also said as a method of performing the pixel interpolation after smoothing the jaggy portion. In this sense, the invention is not limited to the edge direction but it is sufficient to find the cause of the jaggy and smooth the jaggy. The smoothing method can be also changed in accordance with the pattern of a jaggy.

Although the image data is obtained in the preceding step, when a target to be processed can be obtained in a substantial meaning, various modes can be included. For example, besides the case of obtaining image data from an external device, also in the case of performing the interpolating process by using image data to which another process has been executed in a certain device, a step of accessing the image data corresponds to the above. Obviously, the purpose of interpolating the image data is not limited to adjustment of the resolution of a color printer but also adjustment of the resolution of a display.

It is sufficient that image data is obtained by expressing an image in multi-shades of gray by pixels in a dot matrix state. The image data may be in either monotone or color.

Although the edge included in the image and the continuing direction of the edge are detected in the edge direction detecting step, upon detection of the edge direction, it is difficult to directly determine the edge direction. It is easier to set a certain direction as a reference and determine whether or not an edge exists in the direction.

As a specific example of the method, the invention according to claim 2 provides an image data interpolating method according to claim 1 in which in the edge direction detecting step, a facing areas detecting step of dividing an area around a predetermined pixel by a straight line oriented at a predetermined angle by using the predetermined pixel as a reference into two areas and detecting a status of pixels in each of the areas; and an edge determining step of determining the presence or absence of an edge along the straight line on the basis of a difference between the statuses of pixels in the detected two areas are executed.

In the invention according to claim 2 constructed as mentioned above, for example, a straight line passing a certain marked pixel is presumed and the area around the marked pixel is divided into two areas by the straight line. Obviously, it is unnecessary to shift the image data into the two areas in practice but the area is divided into two areas simply by an imaginary straight line. The area is virtually divided into two areas and the status of pixels in each of the areas is detected in the facing areas detecting step. The status of pixels denotes some information indicative of the pixels such as brightness or hue. The status is detected by unit such as a totalizing operation or the like. In the edge determining step, on the basis of the difference between the detected statuses of the pixels in the two areas, the presence or absence of the edge having the predetermined angle is determined.

The operations are performed as mentioned above because of the following background. When an edge exists, the difference between pixels in the areas over the edge is large. In other words, an edge exists when areas having a large difference in pixels are neighboring. When the area is divided in the direction which perpendicularly crosses the actually existing edge, a pair of areas sandwiching the inherent edge are included in each of the areas. That is, the pixels in the areas sandwiching the edge are averaged, so that a difference between the pixels in the areas is reduced.

In the case of detecting the statuses of the pixels by using almost equivalent two areas which face each other over the straight line having a predetermined angle as a target, when a difference between the statuses of the pixels in the two areas is large, it can be said that the straight line coincides with the existing edge. When the difference is small, it can be said that the degree of coincidence between the straight line and the existing edge is low. The determination is carried out in the edge determining step.

In the facing areas detecting step, the statuses of pixels are detected by using almost equivalent two areas which face each other over the virtual edge as a target. The invention is not limited to a specific method of determining an area. Needless to say, an area is preferably not away from the edge. In this sense, an area which is, for example, adjacent to the virtual edge is desirable.

When the status of a plurality of pixels is detected, the processing amount is large. Usually, the number of edge pixels is, however, not so large.

The invention according to claim 3 provides the image data interpolating method according to claim 1 or 2 in which, in the edge direction detecting step, an edge pixel detecting step of preliminarily determining whether or not a marked pixel is an edge or not while shifting the marked pixel for a scan is executed to detect the continuing direction of the edge with respect to the pixel detected as an edge pixel.

In the invention according to claim 3 constructed as mentioned above, when the edge direction detecting step is executed, whether or not a marked pixel is an edge or not is determined while shifting the marked pixel for a scan, and the continuing direction of the edge is detected with respect to the pixel detected as an edge pixel.

Specifically, whether the marked pixel is an edge or not is determined first. When it is not an edge, the process of detecting the edge direction of a heavy load is performed as least as possible. The determination of the edge pixel in this case can be realized by using various filters. For example, it is sufficient to perform a process of assigning predetermined weights to the marked pixel and the neighboring pixels and comparing the resultant pixels.

In the edge smoothing step, the smoothing is performed along the direction in which the edge is continued. The smoothing process is not particularly limited. As an example, the invention according to claim 4 provides the image data interpolating method according to any one of claims 1 to 3 in which, in the edge smoothing step, pixels neighboring the marked pixel in the edge continuing direction are synthesized at a predetermined ratio while shifting the marked pixel.

A jaggy occurs in an edge due to a step portion occurring in the edge direction. By preliminarily synthesizing the pixels in the neighboring direction at a predetermined ratio, the step is reduced. For example, averaging of the pixels eliminates the step.

That is, in the invention according to claim 4 constructed as mentioned above, by synthesizing the pixels neighboring in the edge continuing direction with respect to the marked pixel at a predetermined ratio, the edge is smoothed.

Although the synthesis is carried out at a predetermined ratio, when the ratio is increased, the degree of smoothness becomes higher. When the ratio is reduced, the degree of smoothness becomes lower. By using the relation, the invention according to claim 5 provides to the image data interpolating method according to any one of claims 1 to 4, in which in the edge direction detecting step, an edge degree detecting step of detecting the degree of coincidence with a predetermined edge direction is executed, and in the edge smoothing steps a smoothness degree adjusting step of increasing the degree of smoothness when the degree of coincidence detected is high and decreasing the degree of smoothness when the degree of coincidence is low is performed.

In the invention according to claim 5 constructed as mentioned above, when the edge direction is detected in the edge direction detecting step, the degree of coincidence with the direction in which a predetermined edge continues is detected in the edge degree detecting step. In the following edge smoothing step, when the degree of coincidence detected is high, the degree of smoothness is increased in the smoothness degree adjusting step. When the degree of coincidence is low, the degree of smoothness is lowered.

The degree of coincidence in this case may be either the degree of coincidence in the direction in which the edge is continued or the degree of coincidence in the sense of sharpness of the edge. For example, when the degree of coincidence with respect to the direction of a predetermined fixed straight line having an angle of 45 degrees or 135 degrees is relatively low, it can be considered that the edge direction is actually slightly deviated. When the smoothing is strongly performed in the direction of the straight line, smoothing to pixels to which smoothing should not be performed is carried out, so that it is not always optimum. When the smoothing is performed by setting the degree of synthesis to a relatively low value, it is balanced.

Various interpolating methods to be performed after smoothing of the edge can be employed. It is usually considered that an interpolating process is executed after all of the pixels are smoothed in the edge direction. Holding of the image data smoothed in the edge direction with respect to all of the pixels, however, matters from the viewpoint of storage resources. On the other hand, although an area in a predetermined range is subjected to the interpolating process, the interpolating process is basically strongly influenced by neighboring pixels surrounding the pixel to be interpolated. It is therefore not always necessary to finish the smoothing operation in the edge direction on all of the pixels in the area.

From such a viewpoint, the invention according to claim 6 provides the image data interpolating method according to any one of claims 1 to 5, in which in the pixel interpolating step, when pixel interpolation is executed on the basis of pixels in an area of a predetermined range including a marked pixel in parallel with detection of an edge pixel while shifting the marked pixel for a scan, the marked pixel is a pixel on the rear side in the scan direction in the area.

In the invention according to claim 6 constructed as described above, while shifting the marked pixel, the pixel interpolation is carried out in parallel with the detection of the edge pixel. The pixel interpolation is performed on the basis of pixels in the area of the predetermined range including the marked pixel. Even if all of the pixels in the area are not finished, the pixel interpolation is executed when a pixel on the rear side in the scan direction in the area becomes the marked pixel.

The rear side in such a case denotes that the pixel is at least not on the front side. It denotes that the pixel interpolation is almost finished. In many cases, all of the pixels in the area do not always have similar degrees of influence. In this sense, the invention according to claim 7 provides to the image data interpolating method according to claim 6, in which in the pixel interpolating step, when the scan direction is divided into a main scan direction and a sub-scan direction, the pixel interpolation is executed in the area by using a pixel which is on the rear side in the main scan direction and is on the rear side in the sub-scan direction as a marked pixel among four pixels surrounding the area to be subjected to pixel interpolation.

The pixel interpolation is basically performed on the basis of the four pixels surrounding the area to be interpolated. Consequently, it is sufficient that the smoothing in the edge direction is performed on the four pixels. When the scan direction is divided into the main scan direction and the sub-scan direction, at the time point when the pixel which is on the rear side in the main scan direction and is on the rear side in the sub-scan direction becomes the marked pixel, the smoothing in the edge direction with respect to the four pixels is finished. In the invention according to claim 7 constructed as mentioned above, the pixel interpolation is executed at such a time point.

When it is assumed that the main scan direction of certain image data is from left to right and the sub-scan direction is from top to down, the rear side in the main scan direction is the right side and the rear side in the sub-scan direction is the lower side. It consequently corresponds to the lower right pixel in the upper and lower right and left four pixels.

Similarly, when the four pixels surrounding the area to be subjected to pixel interpolation are compared with the peripheral pixels, it can be said that the former four pixels surrounding the area to be pixel interpolated directly exert a larger influence on the pixel to be interpolated. When the smoothing in the edge direction is performed on the four pixels, an influence in the result is almost the same. In the pixel interpolating step, therefore, while setting the pixels around the four pixels to be a target to be interpolated, the pixel interpolation may be executed on the pixel on the rear side in the main scan direction in the innermost four pixels and is on the rear side in the sub-scan direction as a marked pixel.

That is, as long as the process is finished on the four pixels which exert a great influence on the result, even if pixels referred to in the interpolating process remain unprocessed, the pixel interpolation is executed.

Although various interpolation methods which can be carried out in the pixel interpolating step can be employed, from the viewpoint of performing a pre-process to suppress a jaggy, an interpolating process which suppresses a jaggy while maintaining sharpness is preferable.

The method of performing the pixel interpolation after carrying out the smoothing along the direction in which edges continue is realized by a substantial apparatus. In this sense, it can be easily understood that the invention can be applied as a substantial apparatus. That is, the invention is surely effective as a substantial apparatus.

The image data interpolating method may be carried out by itself or together with another method in a state where it is installed in a device. The idea of the invention is not limited to the above but includes various modes. It can be properly changed to software or hardware.

When an embodiment of the idea of the invention is software for executing the image data interpolating method, it has to be said that the idea of the invention naturally exists on a recording medium on which the software is recorded and is used.

The recording medium can be, of course, a magnetic recording medium or a magnetooptic recording medium. Any recording media which will be developed in future can be similarly considered. The stages of duplication such as primary duplicate or secondary duplicate are regarded as the same without any doubt. The invention is also applied to the case where a communication line is used as a supplying method.

Further, the case where a part is realized by software and a part is realized by hardware is also included in the idea of the invention. A form in which a part is recorded on a recording medium and the rest is properly read as necessary may be also used. All of the functions do not always have to be realized by the program but can be realized by an external program or the like since it is sufficient to make the computer realize each of the functions.

BRIEF DESCRIPTION OF DRAWINGS

Figure 9:
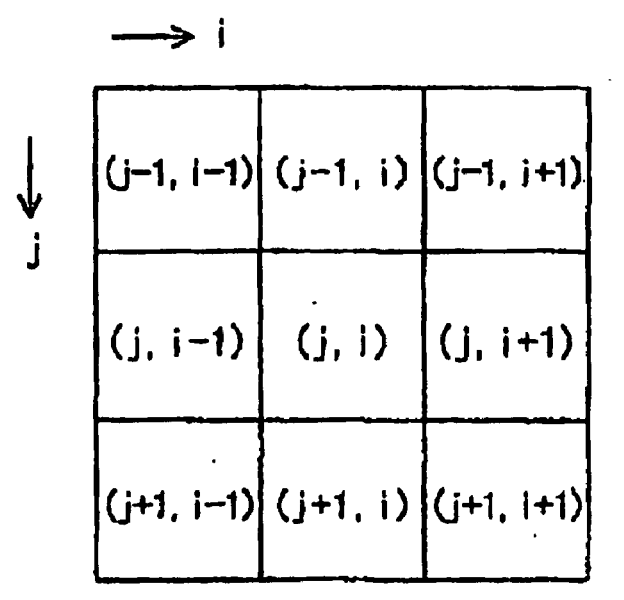

FIG. 9 is a diagram showing an arrangement state of a marked pixel and peripheral pixels when an edge pixel is determined.

FIG. 10 is a diagram showing a filter used to determine an edge pixel.

FIG. 11 is a diagram showing another example of a filter used to determine an edge pixel.

FIG. 12 is a diagram showing another example of a filter used to determine an edge pixel.

BEST MODE FOR CARRYING OUT THE INVENTION

Embodiments of the invention will be described hereinbelow with reference to the drawings.

Figure 1:
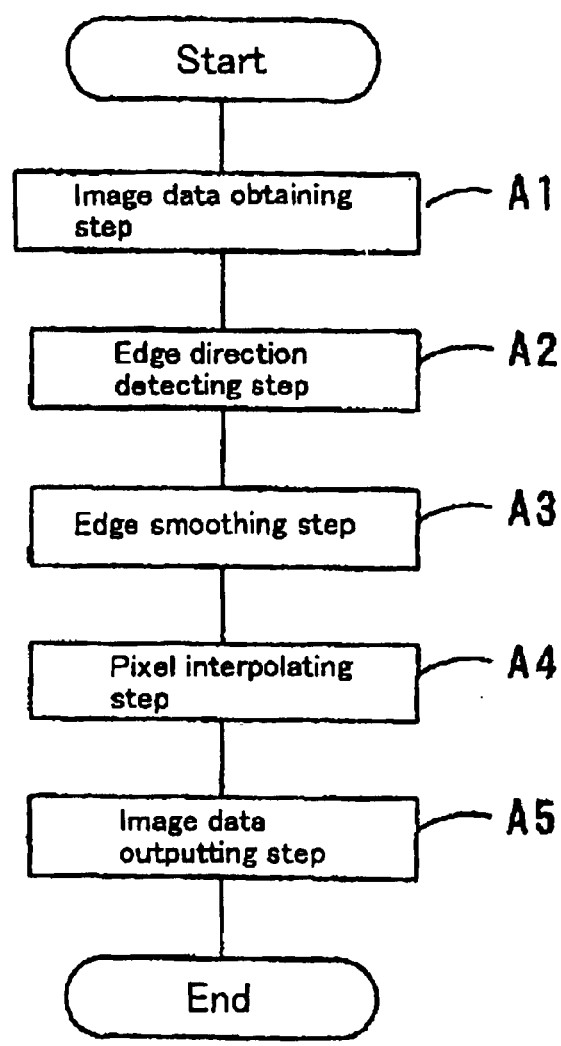
FIG. 1 is a rough flowchart of an image data interpolating method according to an embodiment of the invention.
Figure 2:
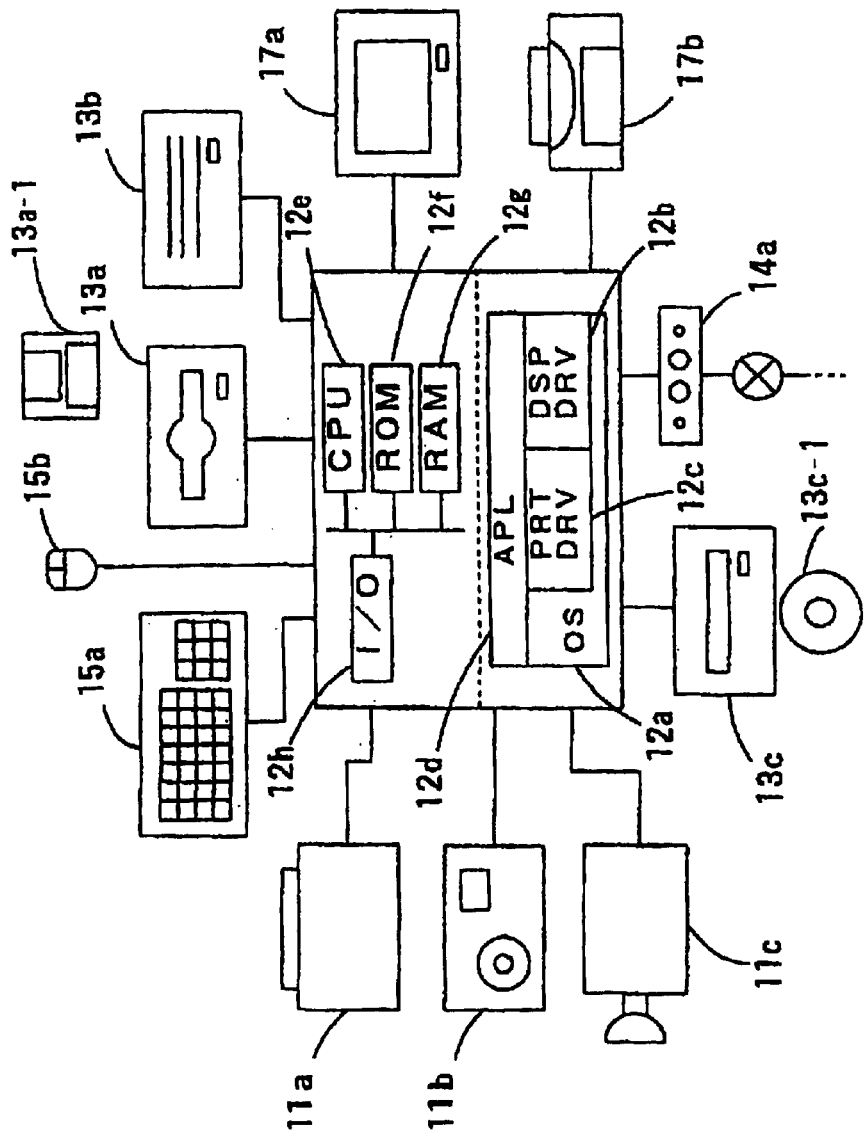
FIG. 2 is a block diagram of a computer system as an image data interpolating apparatus which practices the image data interpolating method.

FIG. 1 is a flowchart showing a procedure of carrying out an image data interpolating method of the invention. FIG. 2 is a block diagram of a computer system 10 which executes the image data interpolating method in accordance with the flowchart.

The computer system 10 comprises a scanner 11a, a digital still camera 11b, and a video camera 11c as image input devices which are connected to a computer body 12. Each input device creates image data by expressing an image by pixels in a dot matrix and can output the image data to the computer body 12. The image data can express about 16,700,000 colors by displaying 256 shades for each of the three primary colors of R, G, and B.

A floppy disk drive 13a, a hard disk 13b, and a CD-ROM drive 13c as external auxiliary storage devices are connected to the computer body 12. On the hard disk 13b, main programs related to the system are recorded and a necessary program or the like can be properly read from a floppy disk 13a-1, a CD-ROM 13c-1, and the like.

As a communication device for connecting the computer body 12 to an external network or the like, a modem 14a is connected. The computer body 12 is connected to an outside network via a public communication line, so that software or data can be downloaded. Although the system accesses the outside by the modem 14a via the telephone line in the example, it can also access a network through a LAN adapter. A keyboard 15a and a mouse 15b are also connected for operating the computer body 12.

Further, as image output devices, a display 17a and a color printer 17b are provided. The display 17a has a display area of 800 pixels in the horizontal direction and 600 pixels in the vertical direction and can display 16,700,000 colors per pixel as mentioned above. Obviously, the resolution is just an example. It can be properly changed to 640×480 pixels, 1024×768 pixels, etc.

The color printer 17b is an ink jet printer and can print an image by applying dots onto a printing paper sheet as a recording medium with color ink of four colors of CMYK. Although high density printing of, for example, 360×360 dpi or 720×720 dpi can be realized, the gradation expression is a two gradation expression of whether the color ink is applied or not.

On the other hand, in order to display or output an image to the image output device while receiving an image by using the image input device, predetermined programs are run on the computer body 12. Among them, an operating system (OS) 12a runs as a basic program. In the operating system 12a, a display driver (DSP DRV) 12b for displaying an image on the display 17a and a printer driver (PRT DRV) 12c for allowing the color printer 17b to print and output the image are included. The drivers 12b and 12c and the like depend on the models of the display 17a and color printer 17b and can be added/changed to/in the operating system 12a in accordance with each of the models. Depending on the model, an additional function more than the standard process can be also realized. That is, various additional processes within a permissible range can be realized while maintaining a processing system which is common on the standard system, namely, the operating system 12a.

As a matter of course, on the precondition of executing such a program, a CPU 12e, a RAM 12f, a ROM 12g, an I/O 12h and the like are provided in the computer body 12. The CPU 12e for executing an arithmetic process properly performs a basic program written on the ROM 12g while using the RAM 12f as a temporary work area, a setup storing area, or a program area, thereby controlling external devices and internal devices connected via the I/O 12h.

An application 12d is executed on the operating system 12a as a basic program. Various processes of the application 12d are executed. The operation of the keyboard 15a and mouse 15b as operating devices is monitored. When the keyboard 15a or mouse 15b is executed, the application 12d executes corresponding arithmetic processes by properly controlling the various external devices and, further, allows the process result to be displayed on the display 17a or outputted to the color printer 17b.

In the computer system 10, image data is obtained by the scanner 11a or the like as an image input device and a predetermined image process is executed by the application 12d. After that, a resultant image can be displayed on the display 17a or outputted to the color printer 17b as image output devices. In this case, when attention is simply paid to correspondence between pixels, in the case where the pixel density of the color printer 17b coincides with that of the scanner 11a, the size of an original image scanned coincides with that of an image to be printed. When the pixel densities are different from each other, however, the sizes of the images become different. Although many scanners 11a have the pixel density similar to that of the color printer 17b, the pixel density of the color printer 17b, which has been being improved for higher picture quality is often higher than that of a general image input device. Especially, the pixel density of the color printer 17b is much higher than display density of the display 17a. When an image is printed by making display on the display 17a coincide with that on the color printer 17b on the pixel unit basis, an extremely small image may be resulted.

Consequently, while determining the pixel density as a reference in the operating system 12a, resolution is converted in order to cancel the difference in the pixel densities of actual devices. For example, when the resolution of the display 17a is 72 dpi and 360 dpi is set as a reference in the operating system 12a, the display driver 12b converts the resolution between them. When the resolution of the color printer 17b is 720 dpi in a similar situation, the printer driver 12c carries out the resolution conversion.

Since the resolution conversion corresponds to a process of increasing the number of pixels constructing image data, it corresponds to an interpolating process. Each of the display driver 12b and the printer driver 12c performs the interpolating process as one of its functions. In this case, each of the display driver 12b and the printer driver 12c executes a program corresponding to the flowchart as shown in FIG. 1 to generate an interpolated image while making a jaggy inconspicuous.

The flowchart shown in FIG. 1 expresses a rough concept. An image data obtaining step A1 of obtaining image data processed by a preceding process as an image data to be subjected to an interpolating process, an edge direction detecting step A2 of detecting the edge direction of each pixel on the basis of the image data, an edge smoothing step A3 for smoothing the edge portion along the edge direction, a pixel interpolating step A4 of executing an inherent interpolating process after the smoothing operation, and an image data outputting step A5 of passing the interpolated image data to the next step are sequentially executed.

Obviously, the display driver 12b and the printer driver 12c are stored on the hard disk 13b and read and run by the computer body 12 at the time of start-up. At the time of introduction, they are recorded on a medium such as the CD-ROM 13c-1 or floppy disk 13a-1 and installed. Each of the media corresponds to a medium on which the image data interpolating program is recorded.

Figure 3:
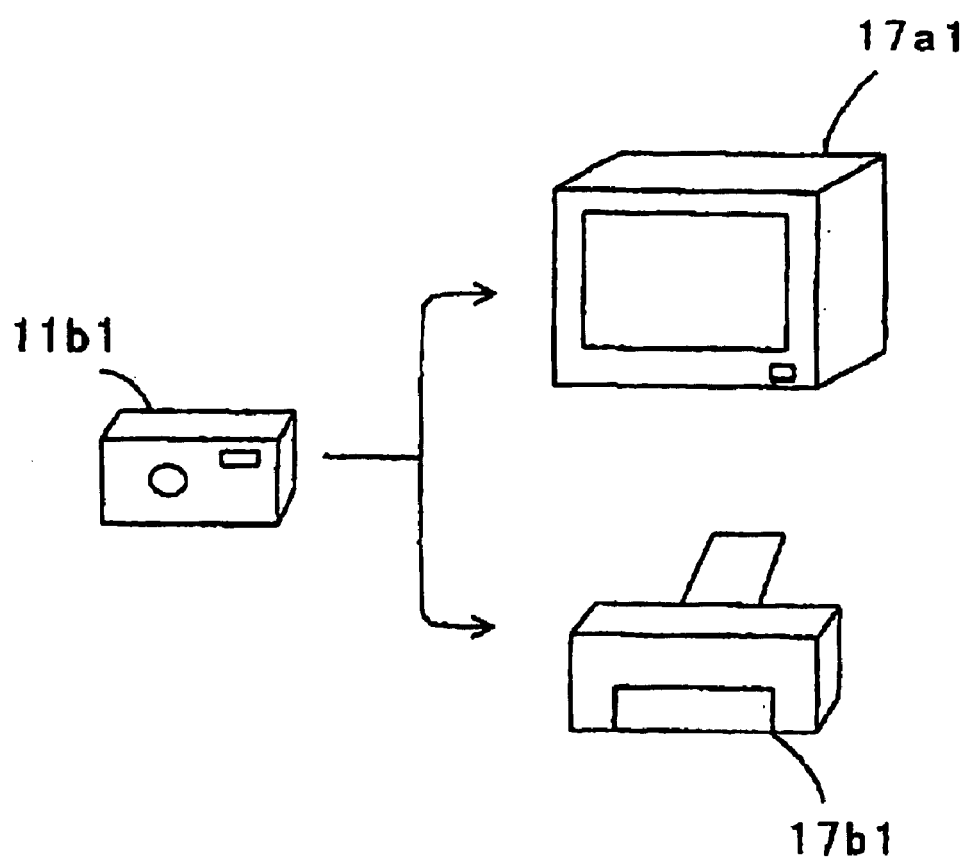
FIG. 3 is a schematic block diagram showing another application example of the image data interpolating method of the invention.
Figure 4:
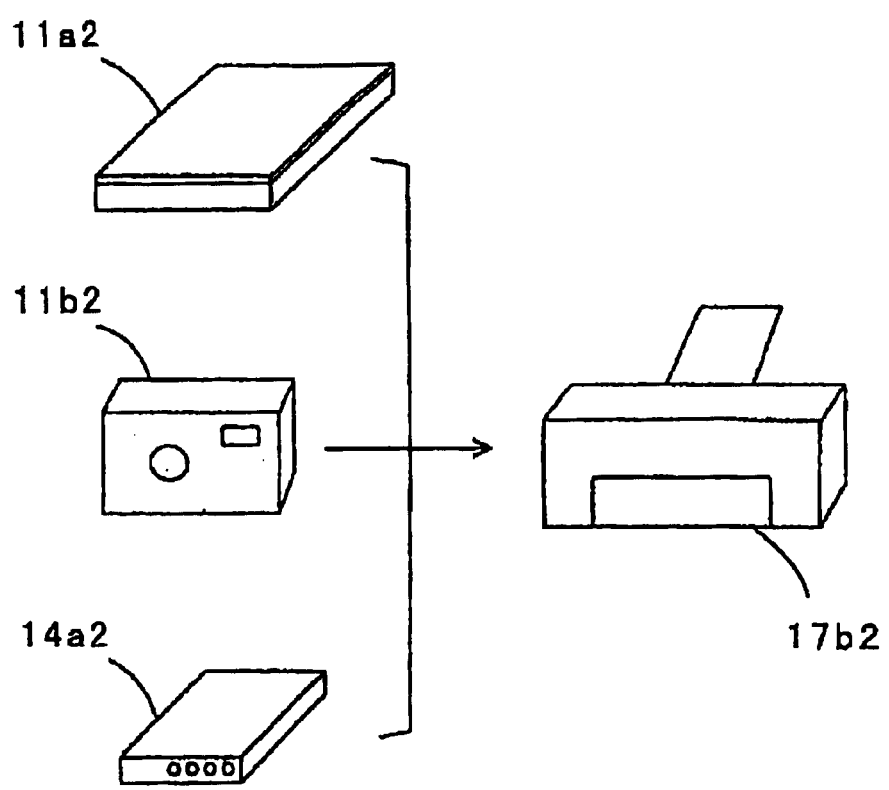
FIG. 4 is a schematic block diagram showing another application example of the image data interpolating method of the invention.

In the embodiment, the image data interpolating method is carried out by the computer system 10. The computer system is, however, not always necessary. Any system which has to perform an interpolating process on similar image data can be used. For example, as shown in FIG. 3, a system in which an image data interpolating device for performing an interpolating process is assembled in a digital still camera 11b1 and which allows interpolated image data to be displayed on a display 17a1 or printed by a color printer 17b1 may be also used. As shown in FIG. 4, a color printer 17b2 which receives and prints image data without using the computer system can automatically convert the resolution of image data supplied via a scanner 11a2, a digital still camera 11b2, a modem 14a2, or the like and print the resultant image data.

Figure 5:
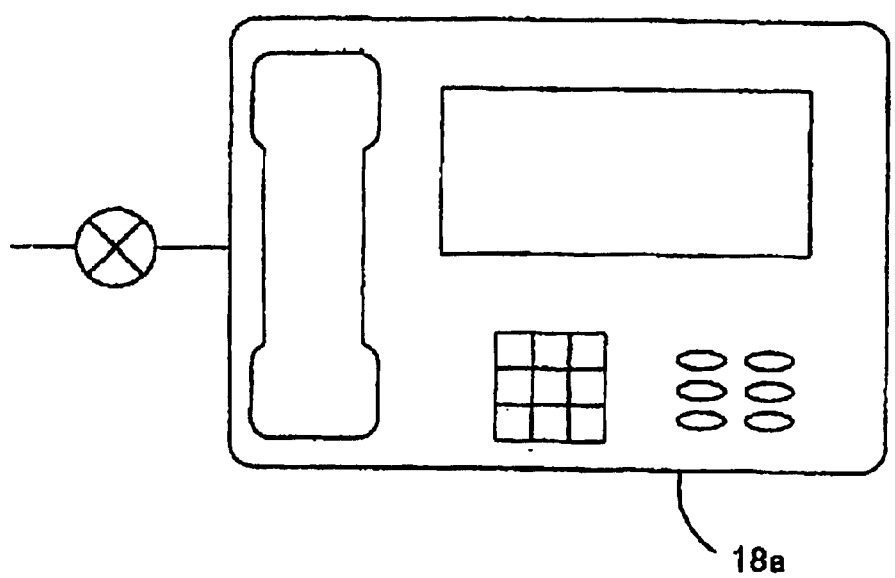
FIG. 5 is a schematic block diagram showing another application example of the image data interpolating method of the invention.
Figure 6:
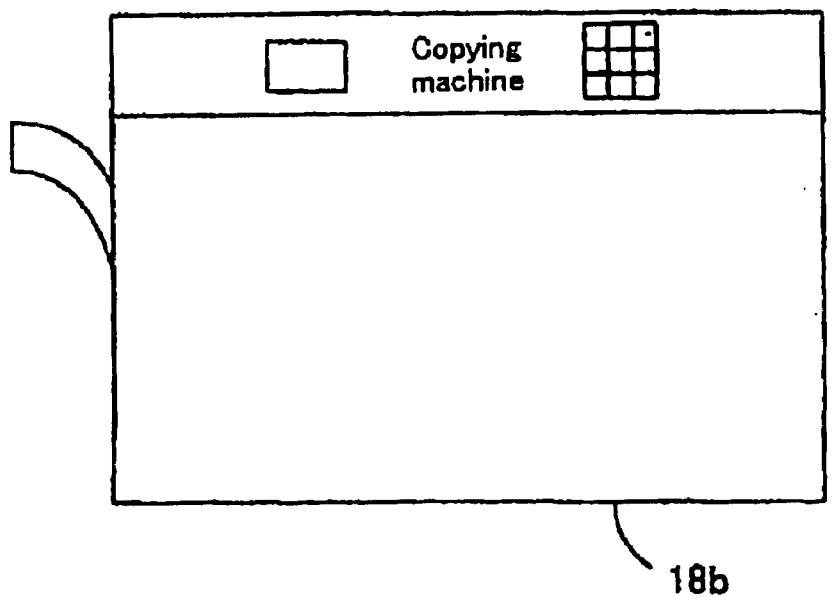
FIG. 6 is a schematic block diagram showing another application example of the image data interpolating method of the invention.

Moreover, the invention can be naturally applied to various devices for dealing with image data such as a color facsimile apparatus 18a as shown in FIG. 5 and a color copying machine 18b as shown in FIG. 6.

Figure 7:
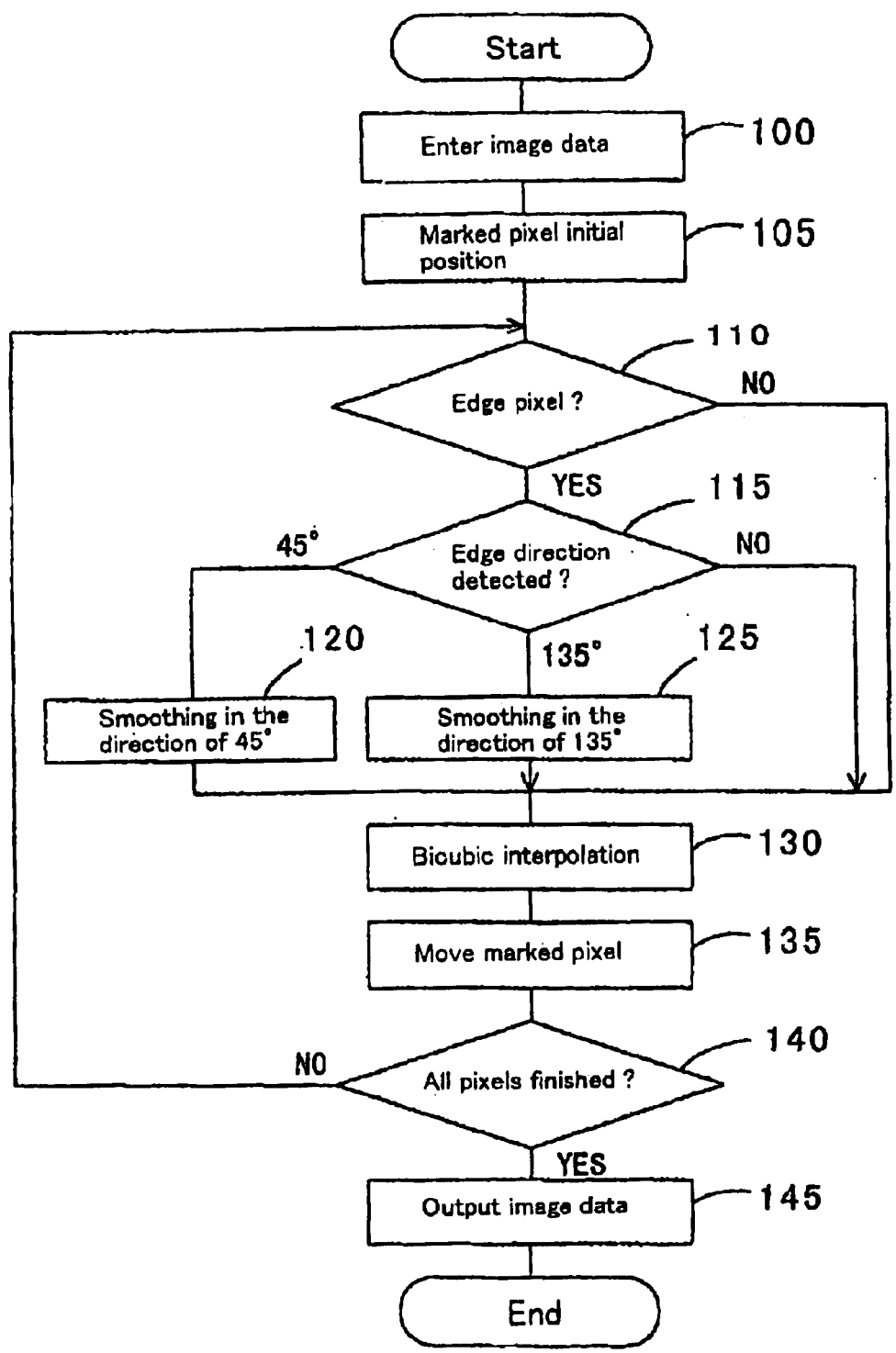
FIG. 7 is a flowchart of the image data interpolating method carried out by the computer system.

The flowchart of FIG. 1 shows a procedure of a rough concept. An actual program does not always have to be clearly divided into the steps. FIG. 7 shows a software flow related to the resolution conversion executed by the printer driver 12c. Although the display driver 12b can also similarly execute the program, in the case such that a high priority is given to the processing speed, the program is not always necessary to be executed by the display driver 12b.

In step 100, image data is entered. According to the application 12d, an image is read by the scanner 11a and subjected to a predetermined image process. After that, the image is subjected to a printing process. Then the print data with a predetermined resolution is transferred via the operating system 12a to the printer driver 12c. The stage of the transfer corresponds to the image data obtaining step A1. As a matter of course, a process of reading an image by the scanner 11a is also possible. At any rate, the process corresponds to the image data obtaining step A1.

Figure 8:
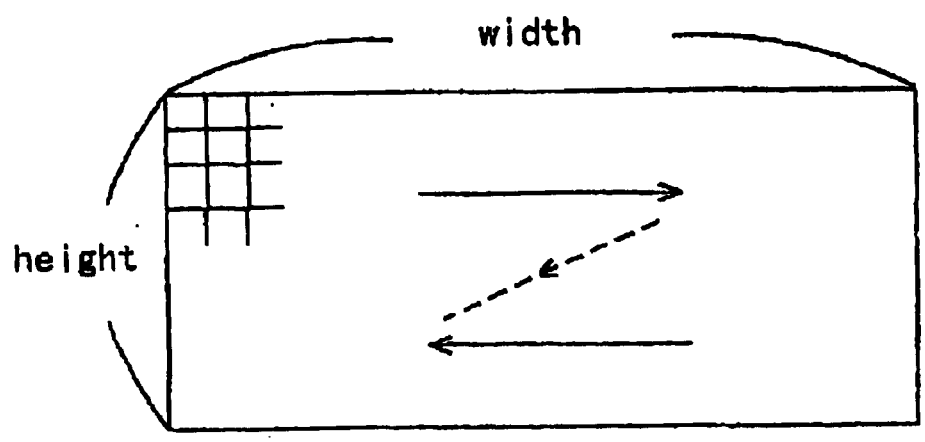
FIG. 8 is a diagram showing a state in which a marked pixel is shifted in a dot-matrix image.

A whole image is scanned on the basis of the read image data and a pixel interpolating process is executed during the scan. That is, not separately performing the edge direction detecting step A2, the edge smoothing step A3, and the pixel interpolating step A4, but the edge direction of each marked pixel is detected while sequentially shifting the marked pixel, the edge is smoothed, and pixels are interpolated. In this sense, the initial position of the marked pixel is set in step 105. In step 110 and subsequent steps, as shown in FIG. 8, a sub-operation of sequentially shifting the scan line in the vertical direction (height direction) while performing a main scan in the horizontal direction (width direction) of an image is executed.

Before detecting the edge direction, in step 110, whether the marked pixel is an edge pixel or not is determined. The edge pixel denotes that neighboring pixels are largely different from each other. In order to determine whether it is an edge pixel or not, therefore, the marked pixel is compared with a neighboring pixel. When the difference between the pixels is large, the marked pixel is determined as an edge pixel. When a pixel in an original image is expressed by $Y(j, i)$ by using two-dimensional coordinates (although the following description will be given on the presumption of luminance, each of the RGB elements may be calculated), the difference (d) between the marked pixel $Y(j, i)$ and the neighboring right pixel is expressed as follows.

$$d = Y(j, i+1) - Y(j, i)$$

Figure 10:
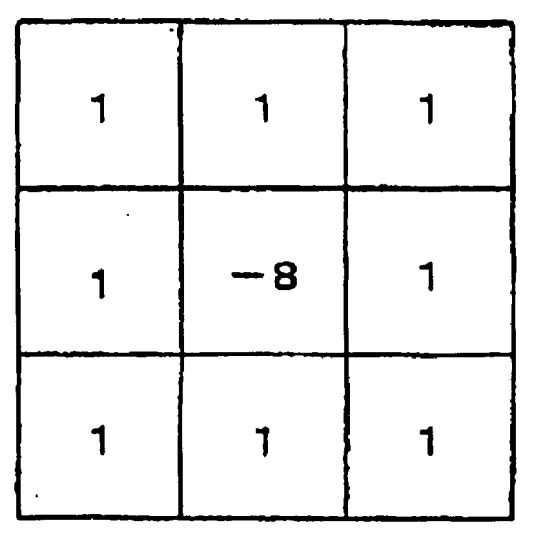

The difference is obtained with respect to each of the neighboring eight pixels in the periphery. In this case, a filter as shown in FIG. 10 is applied. That is, it is expressed as follows.

$$\begin{aligned}
d =\ & Y(j, i+1) - Y(j, i) + Y(j+1, i+1) - Y(j, i) + \\
& Y(j-1, i+1) - Y(j, i) + Y(j, i-1) - Y(j, i) + \\
& Y(j+1, i-1) - Y(j, i) + Y(j-1, i-1) - Y(j, i) + \\
& Y(j, i) - Y(j, i) + Y(j+1, i) - Y(j, i) + \\
& Y(j-1, i) - Y(j, i) \\
=\ & Y(j, i+1) + Y(j+1, i+1) + Y(j-1, i+1) + \\
& Y(j, i-1) + Y(j+1, i-1) + Y(j-1, i-1) + \\
& Y(j, i-1) + Y(j+1, i-1) + Y(j-1, i) - 8 * Y(j, i)
\end{aligned}$$

Although the difference (d) is inherently multiplied by ⅛, since (the absolute value of) the difference (d) is compared with a threshold, it is sufficient to set a relatively large threshold. Consequently, the calculation as mentioned above is performed. When the difference from the neighboring pixel is considered as a vector, the direction has to be also taken into account. In the example, however, it is assumed that the directions are substantially cancelled out by calculating the difference between the marked pixel and each of all the neighboring pixels, so that the direction is ignored.

The work of determining whether or not the marked pixel is an edge pixel is not indispensable. As will be described hereinlater, however, a computation amount to determine the edge direction is large and it is troublesome to execute the computation with respect to all of the pixels. The edge pixel determination is consequently performed so as to reduce the amount of computation. In this case, multiplication is performed once and addition or substraction is performed nine times. In the case of determining the edge direction, as will be described in detail hereinlater, addition or subtraction has to be carried out sixteen times.

Figure 11:
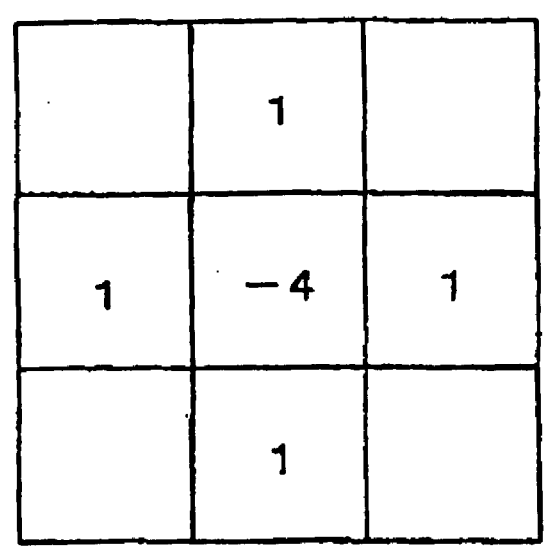
Figure 12:
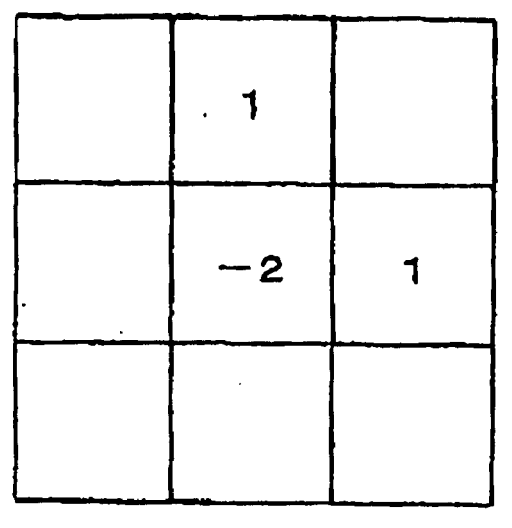

Since the intention is to reduce the computing amount, a filter shown in FIG. 11 or a filter shown in FIG. 12 may be used. The filter shown in FIG. 11 calculates a difference between the marked pixel and each of only four pixels of upper and lower pixels and right and left pixels. The filter shown in FIG. 12 obtains a difference between the marked pixel and each of only neighboring two pixels. In each of the cases, it is sufficient to perform multiplication once and execute addition or subtraction five or three times. The computing amount can be therefore reduced to ½ to ⅓.

Figure 13:
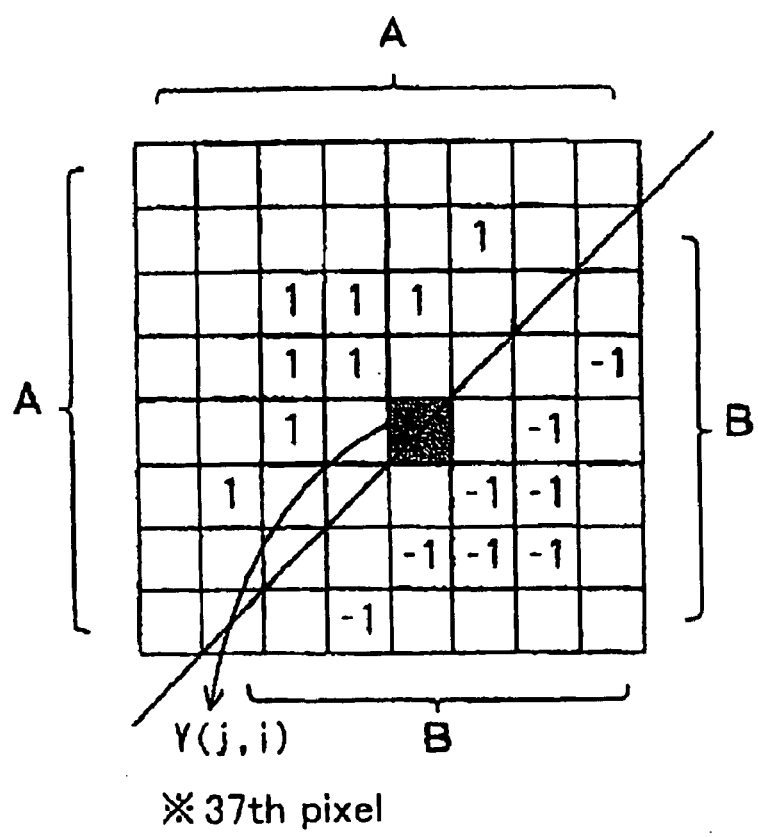
FIG. 13 shows a filter for detecting an edge in the direction of 45 degrees.
Figure 14:
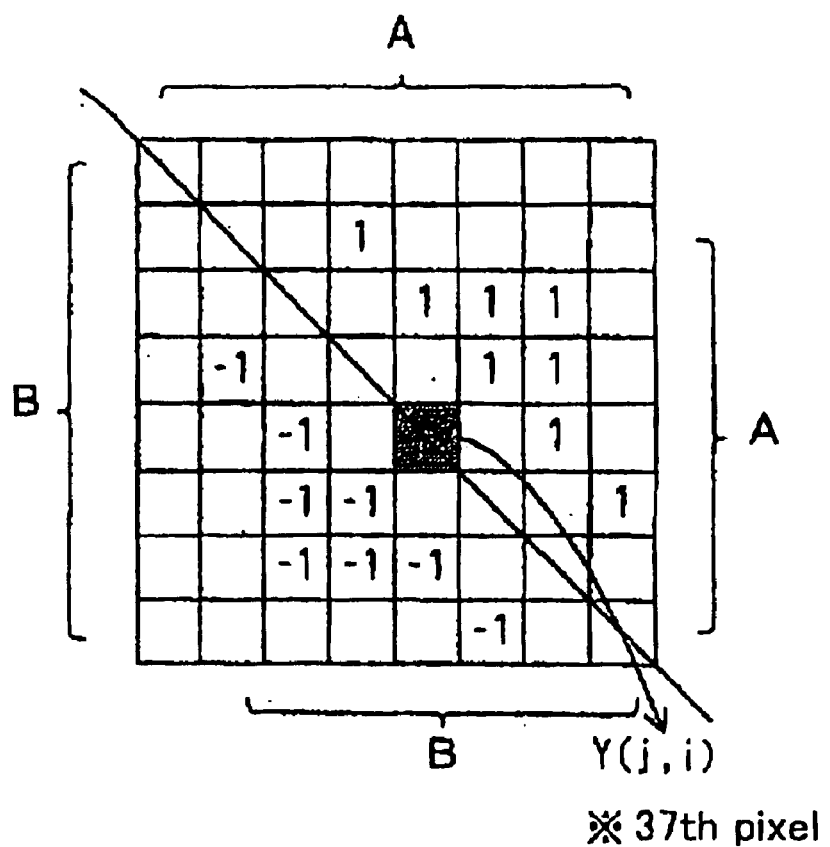
FIG. 14 shows a filter for detecting an edge in the direction of 135 degrees.

In the case where the marked pixel is determined as an edge pixel, the edge direction is detected in step 115. For detecting the edge direction, filters shown in FIGS. 13 and 14 are used. One of the filters is used to detect an edge of 45 degrees (225 degrees) and the other filter is used to detect an edge of 135 degrees (315 degrees),. When computation is performed by assigning a weight of "1" and a weight of "−1" to each of the pixels in an area of 8×8 pixels, a difference between an area A and an area B sandwiching a presumed edge is calculated.

Since an edge is continuous areas where the difference between pixels is large, the difference of pixels over an edge is supposed to be large. When the edge exists in the direction of 45 degrees, it can be said that the difference between areas existing on both sides of the edge is large. Referring to the filters in FIGS. 13 and 14, a weight of "1" and a weight of "−1" are assigned so that only two linear areas are to be compared. The difference D between the areas A and B is obtained as follows.

$$D = \Sigma A - \Sigma B$$

Figure 15A:
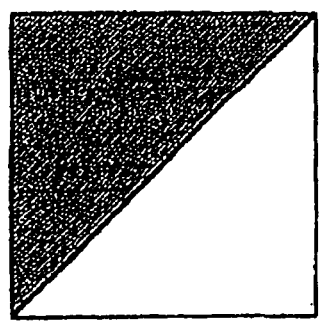
FIG. 15A-15C is an explanatory diagram of a case where an edge detecting filter is applied.
Figure 15A:
Figure 15B:
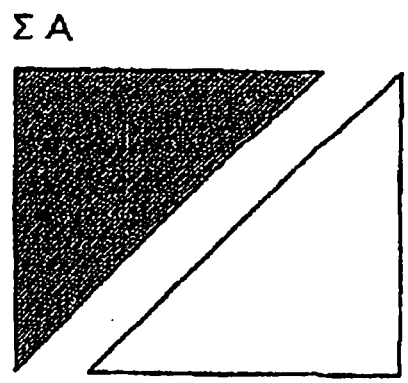
Figure 15C:
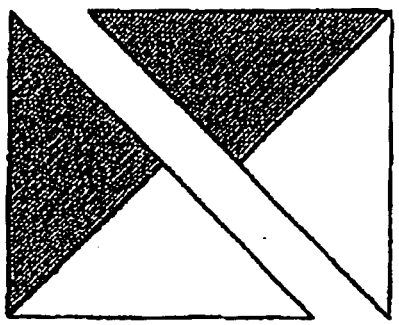

Whether the difference between the two areas is large or not is determined by comparing the difference with threshold thres. When the following relation is satisfied, $$|D| > \text{thres}$$

an edge of 45 degrees or 135 degrees exists. A simple example will be described. It is assumed that an image in which one side from the edge of 45 degrees as a border is black and the other side is white as shown in FIG. 15A exists. When a filter of 45 degrees is applied, as shown in FIG. 15B, weight of "1" is assigned to the black pixels area and added, weight of "−1" is assigned to the white pixel area and added, and a difference between them is obtained. Consequently, the difference between ΣA and ΣB becomes large. In the case of applying a filter of 135 degrees, however, as shown in FIG. 15C, a pair of a black pixel area and a white pixel area exists in each of both areas sandwiching the edge as a border. ΣA and ΣB become equal to each other and the difference is reduced.

Figure 16:
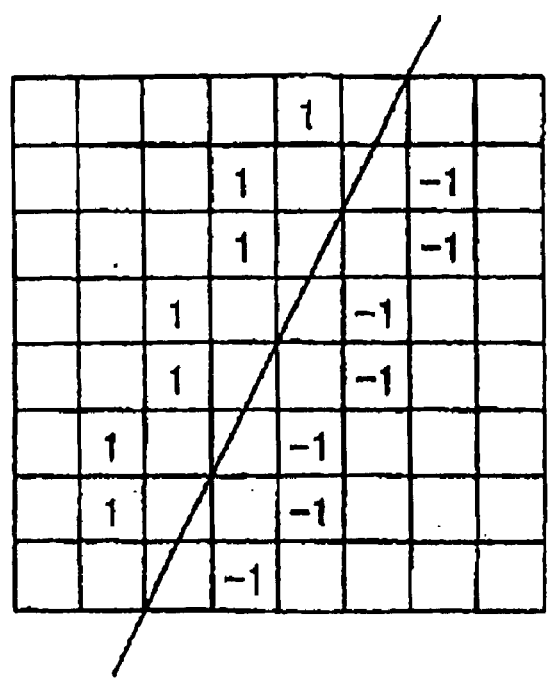
FIG. 16 shows a filter for detecting an edge at another angle.
Figure 17:
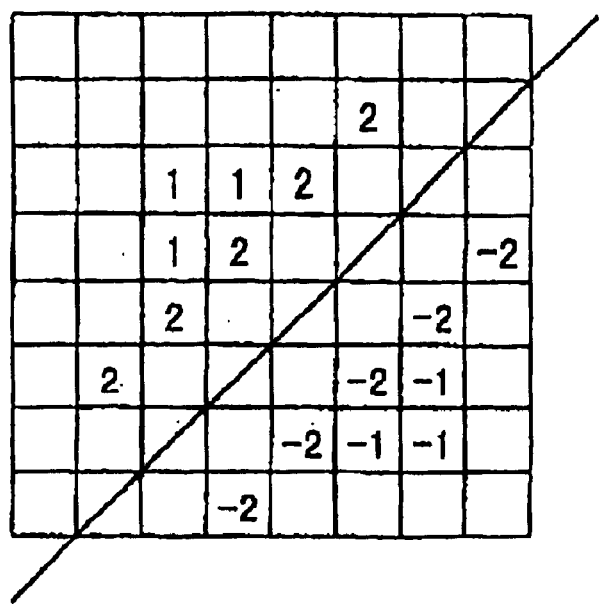
FIG. 17 shows an edge detecting filter to which another weighting is applied.

The angle of an edge is not always limited to 45 degrees or 135 degrees. A filter capable of detecting an edge at other degrees can be also employed. FIG. 16 shows an example of a filter used in the case of the other angle. Weight of "1" is assigned to one side from a presumed edge and weight of "−1" is assigned to the other side. The assigning of weights on a filter can be properly changed. For example, as shown in FIG. 16, it is also possible to assign weight of "2" to an area of a row parallel to the edge and assign weight of "1" to the other area. Further, although the filter is used to detect the edge direction in the foregoing embodiment, other methods can be naturally adopted.

Figure 18:
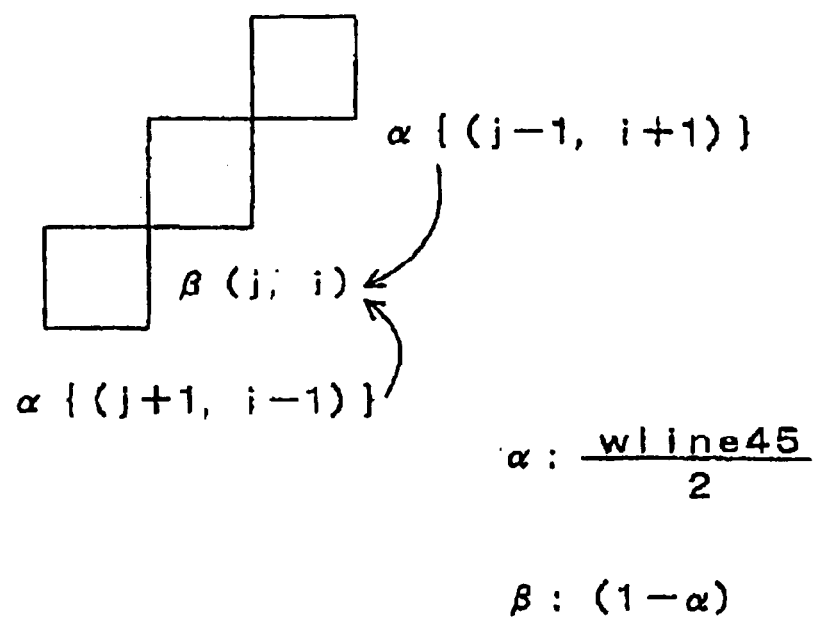
FIG. 18 is a diagram for explaining smoothing in the edge direction.

In step 115, whether or not there is an edge in the direction of 45 degrees or 135 degrees is determined by using the two filters. When an edge is detected, smoothing in the edge direction is performed in step 120 or 125. FIG. 18 shows a smoothing process.

The smoothing in the edge direction is performed by a process of matching pixels with those in the edge direction by using the marked pixel as a reference. In the case of 45 degrees, it is expressed by the following arithmetic equation.

$$Y(j, i) = (Y(j+1, i-1) + Y(j-1, i+1)) * \text{wline45} + Y(j, i) * (1 - \text{wline45})$$

In the case of 135 degrees, it is expressed as follows.

$$Y(j, i) = (Y(j-1, i-1) + Y(j+1, i+1)) * \text{wline135} + Y(j, i) * (1 - \text{wline135})$$

where wline45 is a coefficient showing characteristics of 45 degrees and wline135 is a coefficient showing characteristics of 135 degrees, and wline45 or wline135 is obtained as follows.

$$\text{wline (45 or 135)} = |\Sigma A - \Sigma B| / 2040$$

On the presumption of using the filters shown in FIGS. 13 and 14, the maximum value of $|\Sigma A - \Sigma B|$ is 2040 (=255*8) in the case of 256 gradations (0 to 255). "wline" does not always has to be changeable on the basis of the equation but can be a fixed value. It is also possible to make "wline" draw a curve which suddenly largely changes when $|\Sigma A - \Sigma B|$ becomes large.

The method of changing "wline" in accordance with $|\Sigma A - \Sigma B|$ is adapted to a case where the difference between the areas divided by the edge direction of 45 degrees is large and a case the difference is small. It is also adapted to a case where the difference between the areas divided by the border is constant and there is an edge in a direction which is slightly off from the edge direction of 45 degrees. That is, an effect such that the invention can widely cope with a slightly deviated edge by adjusting the smoothness while using the filters of 45 degrees and 135 degrees is produced.

Figure 19:
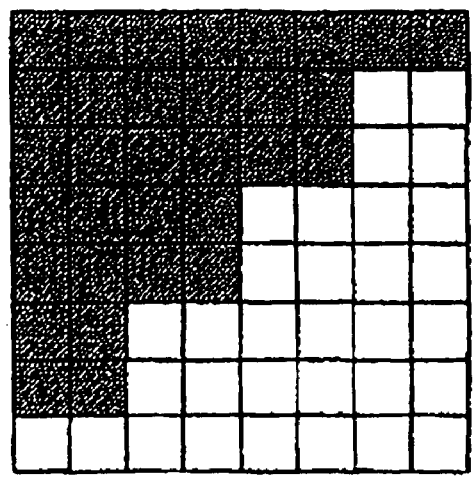
FIG. 19 is a diagram showing an edge portion in an original image in which a jaggy occurs.
Figure 20:
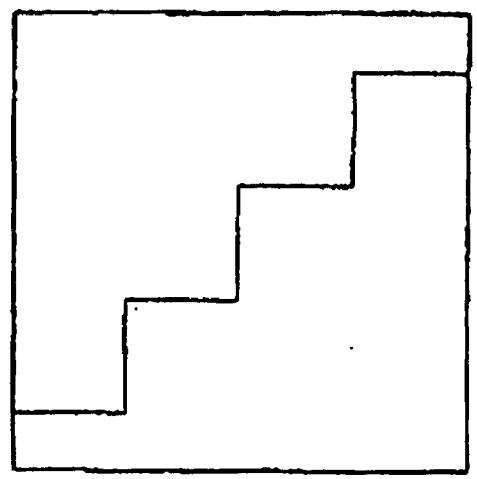
FIG. 20 is a diagram showing an original image in which a jaggy occurs.
Figure 21:
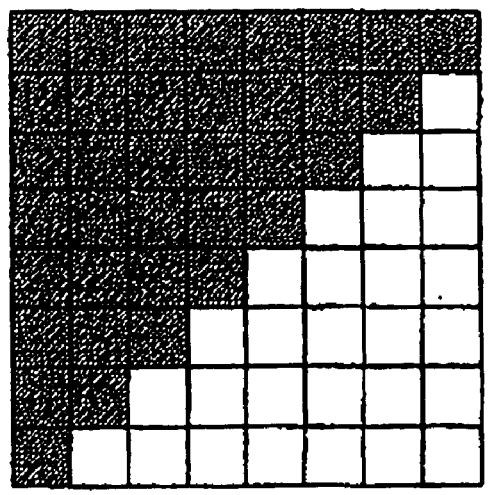
FIG. 21 is a diagram showing a state where smoothing is performed in the edge direction and a jaggy is reduced.

FIG. 19 shows an example of an edge at 45 degrees. In the case of performing the pixel interpolating process, an image having a conspicuous jaggy as shown in FIG. 20 is resulted. When the smoothing is performed along the edge direction in advance, however, as shown in FIG. 21, a jaggy is reduced and smoothed at the stage of the original image and, after that, the pixel interpolating process is performed. Consequently, a jaggy does not easily occur in the pixel interpolated image.

Each of the images shown in FIGS. 19 to 21 is displayed by a white area and a black area. Steps each made by two pixels are only changed to steps each made by one pixel. It seems that a jaggy might occur when the pixel interpolation is performed to a resultant image. In practice, however, each pixel itself is smoothed in the edge direction and, so to speak, a state such that the edge portion becomes gray occurs. When the interpolating process which makes an image sharp is performed on the image, therefore, the jaggy does not remain. An effect such that the edge portion which has become gray is displayed as a sharp edge is produced.

Although the smoothing in the edge direction is realized by an extremely simple method in the example, the smoothing can be also carried out by using an arithmetic equation of a higher degree. The computing amount of the next pixel interpolating process is accordingly large. A sufficient effect can be obtained by the above computing equation.

Step 130 relates to the pixel interpolating process. In the embodiment, pixel interpolation of the M cubic method which will be described hereinlater is executed. The pixel interpolation is executed irrespective of the detection in the edge direction.

Figure 22:
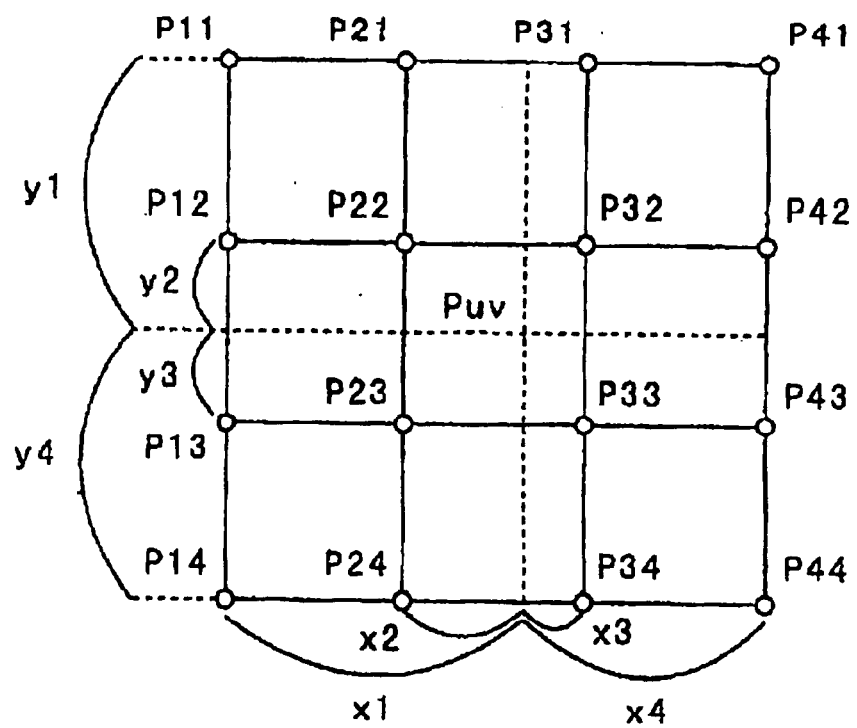
FIG. 22 is a diagram showing an M cubic pixel interpolating method.

Before explaining the M cubic method, a general cubic method will be described. In the cubic method, as shown in FIG. 22, data of not only four lattice points surrounding a point Puv to be interpolated but also data of total 16 lattice points including lattice points around the four lattice points are used. A general expression using a cubic convolution function is as follows.

$$P = [f(y1)f(y2)f(y3)f(y4)] \begin{bmatrix} P11 & P21 & P31 & P41 \\ P12 & P22 & P32 & P42 \\ P13 & P23 & P33 & P43 \\ P14 & P24 & P34 & P44 \end{bmatrix} \begin{bmatrix} f(x1) \\ f(x2) \\ f(x3) \\ f(x4) \end{bmatrix}$$

$$f(t) = \{\sin(\pi t)\}/\pi t$$

$$x1 = 1 + (u - |u|) \quad y1 = 1 + (v - |v|)$$
$$x2 = (u - |u|) \quad y2 = (v - |v|)$$
$$x3 = 1 - (u - |u|) \quad y3 = 1 - (v - |v|)$$
$$x4 = 2 - (u - |u|) \quad y4 = 2 - (v - |v|)$$

The above is developed as follows with respect to P.

$$P = [f(y1)f(y2)f(y3)f(y4)] \begin{bmatrix} P11 \cdot f(x1) + P21 \cdot f(x2) + P31 \cdot f(x3) + P41 \cdot f(x4) \\ P12 \cdot f(x1) + P22 \cdot f(x2) + p32 \cdot f(x3) + P42 \cdot f(x4) \\ P13 \cdot f(x1) + P23 \cdot f(x2) + p33 \cdot f(x3) + P43 \cdot f(x4) \\ P14 \cdot f(x1) + P24 \cdot f(x2) + p34 \cdot f(x3) + P44 \cdot f(x4) \end{bmatrix}$$

$$= f(y1)\{P11 \cdot f(x1) + P21 \cdot f(x2) + P31 \cdot f(x3) + P41 \cdot f(x4)\} +$$
$$f(y2)\{P12 \cdot f(x1) + P22 \cdot f(x2) + P32 \cdot f(x3) + P42 \cdot f(x4)\} +$$
$$f(y3)\{P13 \cdot f(x1) + P23 \cdot f(x2) + P33 \cdot f(x3) + P43 \cdot f(x4)\} +$$
$$f(y4)\{P14 \cdot f(x1) + P24 \cdot f(x2) + P34 \cdot f(x3) + P44 \cdot f(x4)\}$$

$$= P11 \cdot f(x1) \cdot f(y1) + P21 \cdot f(x2) \cdot f(y1) + P31 \cdot f(x3) \cdot f(y1) + P41 \cdot f(x4) \cdot f(y1) +$$
$$P12 \cdot f(x1) \cdot f(y2) + P22 \cdot f(x2) \cdot f(y2) + P32 \cdot f(x3) \cdot f(y2) + P42 \cdot f(x4) \cdot f(y2) +$$
$$P13 \cdot f(x1) \cdot f(y3) + P23 \cdot f(x2) \cdot f(y3) + P33 \cdot f(x3) \cdot f(y3) + P43 \cdot f(x4) \cdot f(y3) +$$
$$P14 \cdot f(x1) \cdot f(y4) + P24 \cdot f(x2) \cdot f(y4) + P34 \cdot f(x3) \cdot f(y4) + P44 \cdot f(x4) \cdot f(y4)$$

Substitution can be performed as follows.

$$f(t) = \{\sin(\pi t)\}/\pi t$$

$$\doteq \begin{cases} 1 - 2|t|2 + |t|3 & : 0 \leq |t| < 1 \\ 4 - 8|t| + 5|t|2 - |t|3 & : 1 \leq |t| < 2 \\ 0 & : 2 \leq |t| \end{cases}$$

Figure 23:
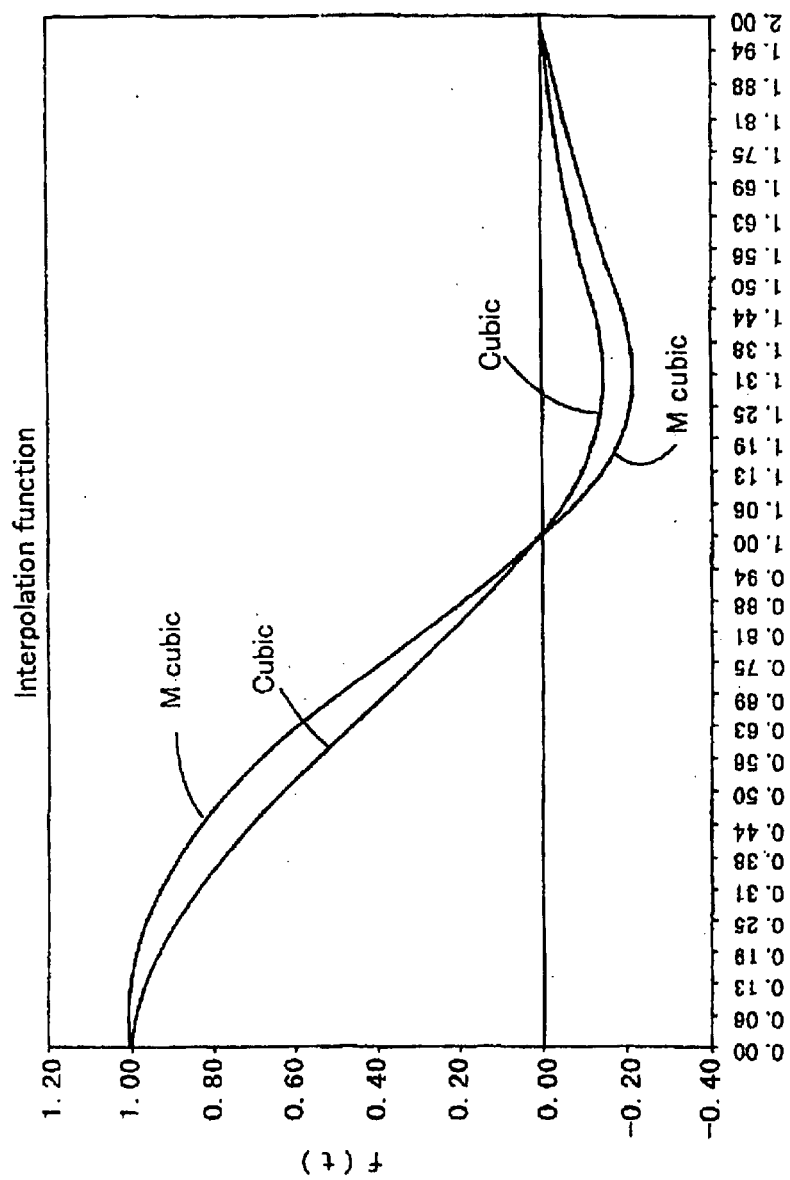
FIG. 23 is a diagram showing a change in an interpolation function used in the M cubic method.

FIG. 23 is a chart showing an interpolation function f(t) in the cubic method. In the chart, the lateral axis denotes the position and the vertical axis shows the interpolation function. Lattice points exist at positions where t=0, t=1, and t=2 and interpolation points are at positions from t=0 to 1.

In the cubic method, the interpolation function decreases gradually in an arcuate curve between neighboring two points (t=0 to 1) and further decreases outside of the two points (t=1 to 2). That is, a certain edge portion is changed so as to have a large difference between the high and low values without causing a step. A preferable influence such that sharpness increases and yet no step occurs is exerted on a photograph.

According to the cubic method, expression in a cubic function manner is possible. By adjusting the shape of the curve, the quality of the interpolation result can be changed.

As an example of the adjustment, the following will be called an M cubic method. In the embodiment, the interpolating process is executed.

$$0 < t < 0.5 \, f(t) = -(8/7)t3 - (4/7)t2 + 1$$

$$0.5 < t < 1 \, f(t) = (1-t)(10/7)$$

$$1 < t < 1.5 \, f(t) = (8/7)(t-1)3 + (4/7)(t-1)2 - (t-1)$$

$$1.5 < t < 2 \, f(t) = (3/7)(t-2)$$

FIG. 23 shows an interpolation function in the M cubic method. The cubic functional curve is slightly sharper and it denotes that the entire image becomes sharper.

To perform the pixel interpolation by the M cubic method, as mentioned above, the area of 4×4 pixels is used as a target and pixels are interpolated in the area of 2×2 pixels on the inner side. Consequently, it is preferable to finish smoothing in the edge direction with respect to all of 4×4 pixels as a reference of the pixel interpolation by the time of interpolation.

Figure 24:
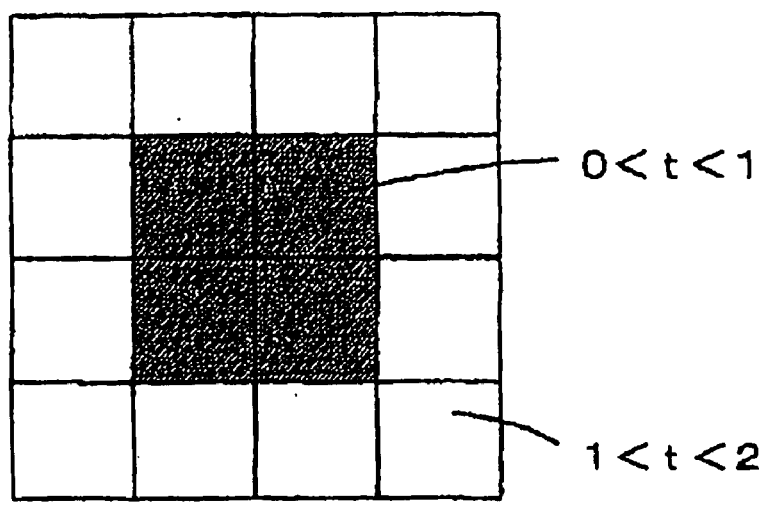
FIG. 24 is a diagram showing pixels on the inner side which exert a great influence on a pixel to be interpolated and pixels on the outer side.

As shown in FIG. 24, each of pixels generated in the area of the 2×2 pixels on the inner side satisfies 0<t<1 and each of twelve pixels on the outer side satisfies 1<t<2. As understood from the interpolation function shown in FIG. 23, the coefficient used to refer to a pixel on the outer side is naturally small. That is, basically, it is strongly influenced by the four pixels on the inner side. The twelve pixels on the outer side just exert an influence on the curve of the degree of change. In consideration of the states, even if smoothing is not completed with respect to all of the 4×4 pixels to be referred to, when at least the pixels on the inner side have been smoothed, it can be said that there is no much influence.

On the contrary, in the case of performing interpolation after smoothing all of pixels referred to, there are detrimental effects such that a marked pixel for smoothing and a marked pixel for generating an interpolation pixel have to be separately looped and the smoothness wline has to be stored by an amount corresponding to the interval between the two marked pixels.

Figure 25:
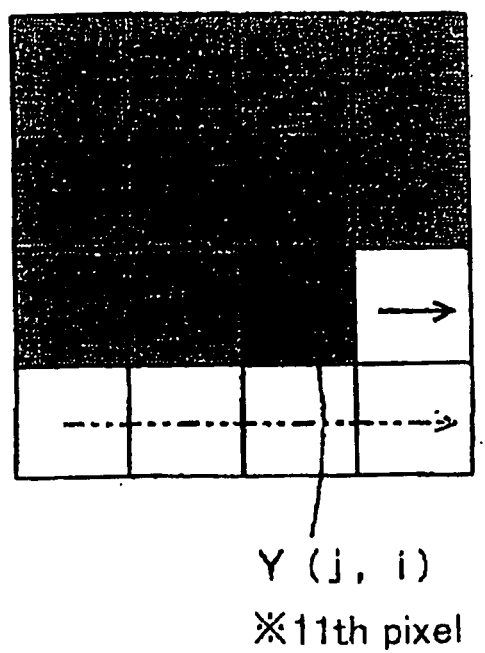
FIG. 25 is a diagram showing a state where the smoothing is completed when pixels on the inner side are finished during shifting a marked pixel for scanning.

In consideration of the above, in the embodiment, the pixel interpolation of the M cubic method is performed after the four pixels on the inner side which exert a great effect when referred to in the pixel interpolation as shown in FIG. 24 are finished. On the precondition that a sub-scan is performed while carrying out a main scan by shifting the marked pixel as shown in FIG. 8, the four pixels on the inner side are finished after ten pixels are smoothed as shown in FIG. 25. In the case of the filter of 8×8 pixels shown in FIGS. 13 and 14, at the timing, a hatched pixel becomes a marked pixel. To be specific, pixels are scanned as shown in FIG. 8 by using a single pixel as a marked pixel. The filter of 8×8 pixels is applied at the 37th pixel after 36 pixels are completed as shown in FIGS. 13 and 14. In the target area of 4×4 pixels, it is applied at the eleventh pixel after completion of ten pixels. As a result, while simplifying the control of the marked pixel, the pixel interpolation can be performed in a state where no large error is expected.

In the embodiment, the marked pixel is positioned as shown in FIGS. 13, 14 or 25 with respect to the scanning direction as shown in FIG. 8. It can be properly changed by a control method.

After executing the M cubic pixel interpolation as described above, in step 135, the marked pixel is advanced only by one pixel as shown in FIG. 8 and the processes of step 110 and subsequent steps are repeated until it is determined in step 140 that all of the pixels are processed. If it is determined that all of the pixels are processed, the routine advances to step 145 where image data which has been subjected to the pixel interpolating process is outputted to a predetermined area. In this case, the printer driver can output the image data as raster data to the color printer 17b. In the case of executing a further image process, the image data is transferred as data to be processed.

As described above, when the pixel interpolation is performed on an image of a dot matrix state, image data is entered in step 100, the whole image is scanned with respect to the marked pixel. In step 115, whether or not an edge exists in the direction of 45 degrees or in the direction of 135 degrees of the marked pixel as a reference is detected. When there is an edge at 45 or 135 degrees, the edge is smoothed in the direction of 45 or 135 degrees in step 120 or 125. After that, the pixel interpolation is performed irrespective of the presence or absence of an edge. It can be consequently prevented that pixel interpolation is performed in a state where there is an irregular edge or the like and a jaggy occurs.

INDUSTRIAL APPLICABILITY

The invention according to claims 1, 8 and 15 as described above can provide image data interpolating methods capable of suppressing occurrence of a jaggy in an interpolated image by performing pixel interpolation after eliminating the cause of the jaggy.

The invention according to claims 2, 9 and 16 can detect the edge direction relatively easily.

Further, the invention according to claims 3, 10 and 17 can reduce a processing amount since the edge direction is not determined with respect to all of pixels but is determined with respect to only a pixel which is determined as an edge by performing relatively easy edge pixel determination.

Further, the invention according to claims 4, 11 and 18 can perform smoothing in the edge direction relatively easily.

Further, the invention according to claims 5, 12 and 19 can perform better smoothing by making the degree of smoothing in the edge direction correspond to characteristics of the edge.

Further, the invention according to claims 6, 13 and 20 can execute a pixel interpolating process in parallel without requiring much storage resources.

Further, the invention according to claims 7, 14 and 21 can execute both smoothing and pixel interpolation in parallel when an area of four pixels surrounding an area to be interpolated. For example, when the smoothing is performed to the innermost four pixels surrounding the area to be subjected to pixel interpolation and then the interpolating process is performed, effects similar to the case where all of the area is smoothed can be obtained.

What is claimed is:

1. An image data interpolating method characterized by comprising:
    an edge direction detecting step of detecting an edge included in image data and a continuing direction of the edge;
    an edge smoothing step of smoothing a portion of the detected edge along the edge continuing direction; and
    a pixel interpolating step performing an interpolating process on said image data which additionally sharpens said image data after smoothing the edge.

2. An image data interpolating method characterized by comprising:
    an edge direction detecting step of detecting an edge included in image data and a continuing direction of the edge;
    an edge smoothing step of smoothing a portion of the detected edge along the edge continuing direction; and
    a pixel interpolating step of performing an interpolating process after smoothing the edge,
    wherein in the edge direction detecting step, a facing areas detecting step of dividing an area around a predetermined pixel by a straight line oriented at a predetermined angle by using the predetermined pixel as a reference into two areas and detecting a status of pixels in each of the areas; and an edge determining step of determining the presence or absence of an edge along the straight line on the basis of a difference between the statuses of pixels in the detected two areas are executed.

3. An image data interpolating method characterized by comprising:
    an edge direction detecting step of detecting an edge included in image data and a continuing direction of the edge;
    an edge smoothing step of smoothing a portion of the detected edge along the edge continuing direction; and
    a pixel interpolating step of performing an interpolating process after smoothing the edge,
    wherein in the edge direction detecting step, an edge pixel detecting step of preliminarily determining whether or not a marked pixel is an edge or not while shifting the marked pixel for scanning is executed to detect the continuing direction of the edge with respect to the pixel detected as an edge pixel.

4. An image data interpolating method characterized by comprising:
    an edge direction detecting step of detecting an edge included in image data and a continuing direction of the edge;

an edge smoothing step of smoothing a portion of the detected edge along the edge continuing direction; and a pixel interpolating step of performing an interpolating process after smoothing the edge, wherein in the edge smoothing step, pixels neighboring the marked pixel in the edge continuing direction are synthesized at a predetermined ratio while shifting the marked pixel.

5. An image data interpolating method characterized by comprising:

an edge direction detecting step of detecting an edge included in image data and a continuing direction of the edge;

an edge smoothing step of smoothing a portion of the detected edge along the edge continuing direction; and a pixel interpolating step of performing an interpolating process after smoothing the edge, wherein in the edge direction detecting step, an edge degree detecting step of detecting the degree of coincidence with a predetermined edge direction is executed, and in the edge smoothing step, a smoothness degree adjusting step of increasing the degree of smoothness when the degree of coincidence detected is high and decreasing the degree of smoothness when the degree of coincidence is low is executed.

6. An image data interpolating method characterized by comprising:

an edge direction detecting step of detecting an edge included in image data and a continuing direction of the edge;

an edge smoothing step of smoothing a portion of the detected edge along the edge continuing direction; and a pixel interpolating step of performing an interpolating process after smoothing the edge, wherein in the pixel interpolating step, when pixel interpolation is executed on the basis of pixels in an area of a predetermined range including a marked pixel in parallel with detection of an edge pixel while shifting the marked pixel, the pixel interpolation is executed so that the marked pixel is a pixel on the rear side in the scan direction in the area.

7. The image data interpolating method according to claim 6, characterized in that in the pixel interpolating step, when the scan direction is divided into a main scan direction and a sub-scan direction, the pixel interpolation is executed in the area by using a pixel which is on the rear side in the main scan direction and on the rear side in the sub-scan direction as a marked pixel among four pixels surrounding the area to be subjected to pixel interpolation.

8. An image data interpolating apparatus characterized by comprising:

edge direction detecting unit for detecting an edge included in image data and a continuing direction of the edge;

edge smoothing unit for smoothing a portion of the detected edge along the edge continuing direction; and pixel interpolating unit for performing an interpolating process on said image data which additionally sharpens said image data after smoothing the edge.

9. An image data interpolating apparatus characterized by comprising:

edge direction detecting unit for detecting an edge included in image data and a continuing direction of the edge;

edge smoothing unit for smoothing a portion of the detected edge along the edge continuing direction; and pixel interpolating unit for performing an interpolating process after smoothing the edge, wherein the edge direction detecting unit executes: facing areas detecting unit of dividing an area around a predetermined pixel by a straight line oriented at a predetermined angle into two areas by using the predetermined pixel as a reference and detecting a status of pixels in each of the areas; and edge determining unit of determining the presence or absence of an edge along the straight line on the basis of a difference between the statuses of pixels in the detected two areas.

10. An image data interpolating apparatus characterized by comprising:

edge direction detecting unit for detecting an edge included in image data and a continuing direction of the edge;

edge smoothing unit for smoothing a portion of the detected edge along the edge continuing direction; and pixel interpolating unit for performing an interpolating process after smoothing the edge, wherein the edge direction detecting unit comprises edge pixel detecting unit of preliminarily determining whether a marked pixel is an edge or not while shifting the marked pixel for a scan, and detects the edge continuing direction with respect to a pixel detected as an edge pixel by the edge pixel detecting unit.

11. An image data interpolating apparatus characterized by comprising:

edge direction detecting unit for detecting an edge included in image data and a continuing direction of the edge;

edge smoothing unit for smoothing a portion of the detected edge along the edge continuing direction; and pixel interpolating unit for performing an interpolating process after smoothing the edge, wherein the edge smoothing unit synthesizes pixels neighboring in the edge continuing direction with respect to a marked pixel at a predetermined ratio while shifting the marked pixel for a scan.

12. An image data interpolating apparatus characterized by comprising:

edge direction detecting unit for detecting an edge included in image data and a continuing direction of the edge;

edge smoothing unit for smoothing a portion of the detected edge along the edge continuing direction; and pixel interpolating unit for performing an interpolating process after smoothing the edge, wherein the edge direction detecting unit comprises edge degree detecting unit of detecting the degree of coincidence with a predetermined edge direction, and the edge smoothing unit comprises smoothness degree adjusting unit of increasing the degree of smoothness when the degree of coincidence detected by the edge degree detecting unit is high and decreasing the degree of smoothness when the degree of coincidence is low.

13. An image data interpolating apparatus characterized by comprising:

edge direction detecting unit for detecting an edge included in image data and a continuing direction of the edge;

edge smoothing unit for smoothing a portion of the detected edge along the edge continuing direction; and pixel interpolating unit for performing an interpolating process after smoothing the edge, wherein when pixel interpolation is executed on the basis of pixels in an area of a predetermined range including a marked pixel in parallel with detection of an edge pixel while shifting the marked pixel for a scan, the pixel interpolating unit executes the pixel interpolation so that the marked pixel is a pixel on the rear side in the scan direction in the area.

14. The image data interpolating apparatus according to claim 13, characterized in that when the scan direction is divided into a main scan direction and a sub-scan direction, the pixel interpolating unit executes the pixel interpolation in the area by using a pixel which is on the rear side in the main scan direction and is on the rear side in the sub-scan direction among four pixels surrounding the area to be subjected to pixel interpolation.

15. A medium on which an image data interpolating program for realizing a function of performing pixel interpolation on image data by a computer is recorded, characterized in that the computer is allowed to execute:

an edge direction detecting function of detecting an edge included in the image data and a continuing direction of the edge;

an edge smoothing function of smoothing a portion of the detected edge along the edge continuing direction; and a pixel interpolating function of performing an interpolating process on said image data which additionally sharpens said image data after smoothing the edge.

16. A medium on which an image data interpolating program for realizing a function of performing pixel interpolation on image data by a computer is recorded, characterized in that the computer is allowed to execute:

an edge direction detecting function of detecting an edge included in the image data and a continuing direction of the edge;

an edge smoothing function of smoothing a portion of the detected edge along the edge continuing direction; and a pixel interpolating function of performing an interpolating process after smoothing the edge, wherein in the edge direction detecting function, a facing areas detecting function of dividing an area around a predetermined pixel by a straight line oriented at a predetermined angle by using the predetermined pixel as a reference into two areas and detecting a status of pixels in each of the areas; and an edge determining function of determining the presence or absence of an edge along the straight line on the basis of a difference between statuses of pixels in the detected two areas are executed.

17. A medium on which an image data interpolating program for realizing a function of performing pixel interpolation on image data by a computer is recorded, characterized in that the computer is allowed to execute:

an edge direction detecting function of detecting an edge included in the image data and a continuing direction of the edge;

an edge smoothing function of smoothing a portion of the detected edge along the edge continuing direction; and a pixel interpolating function of performing an interpolating process after smoothing the edge, wherein the edge direction detecting function executes an edge pixel detecting function of preliminarily determining whether a marked pixel is an edge or not while shifting the marked pixel for a scan, and detects the edge continuing direction with respect to the pixel detected as an edge pixel.

18. A medium on which an image data interpolating program for realizing a function of performing pixel interpolation on image data by a computer is recorded, characterized in that the computer is allowed to execute;

an edge direction detecting function of detecting an edge included in the image data and a continuing direction of the edge;

an edge smoothing function of smoothing a portion of the detected edge along the edge continuing direction; and a pixel interpolating function of performing an interpolating process after smoothing the edge, wherein the edge smoothing function synthesizes pixels neighboring in the edge continuing direction with respect to a marked pixel at a predetermined ratio while shifting the marked pixel for a scan.

19. A medium on which an image data interpolating program for realizing a function of performing pixel interpolation on image data by a computer is recorded, characterized in that the computer is allowed to execute:

an edge direction detecting function of detecting an edge included in the image data and a continuing direction of the edge;

an edge smoothing function of smoothing a portion of the detected edge along the edge continuing direction; and a pixel interpolating function of performing an interpolating process after smoothing the edge, wherein in the edge direction detecting function, an edge degree detecting function of detecting the degree of coincidence with a predetermined edge direction is executed and, in the edge smoothing function, a smoothness degree adjusting function of increasing the degree of smoothness when the degree of coincidence detected is high and decreasing the degree of smoothness when the degree of coincidence is low is executed.

20. A medium on which an image data interpolating program for realizing a function of performing pixel interpolation on image data by a computer is recorded, characterized in that the computer is allowed to execute:

an edge direction detecting function of detecting an edge included in the image data and a continuing direction of the edge;

an edge smoothing function of smoothing a portion of the detected edge along the edge continuing direction; and a pixel interpolating function of performing an interpolating process after smoothing the edge, wherein when pixel interpolation is executed on the basis of pixels in an area of a predetermined range including a marked pixel in parallel with detection of an edge pixel while shifting the marked pixel for a scan, the pixel interpolating function executes the pixel interpolation so that the marked pixel is a pixel on the rear side in the scan direction in the area.

21. The medium on which the image data interpolating program is recorded according to claim 20, characterized in that when the scan direction is divided into a main scan direction and a sub-scan direction, the pixel interpolating function executes the pixel interpolation in the area by using a pixel which is on the rear side in the main scan direction and is on the rear side in the sub-scan direction as a marked pixel among four pixels surrounding the area to be subjected to pixel interpolation.

* * * * *